Dec. 19, 1950 E. R. SHENK ET AL 2,534,388

AUTOMATIC CODE SIGNAL DISCRIMINATING DEVICE

Filed Oct. 29, 1949 6 Sheets-Sheet 1

INVENTORS
EUGENE R. SHENK AND
JAMES C. PHELPS
BY Harry Tunick
ATTORNEY

AUTOMATIC CODE SIGNAL DISCRIMINATING DEVICE

INVENTOR
EUGENE R. SHENK AND
JAMES C. PHELPS
BY Harry Tunick
ATTORNEY

Dec. 19, 1950 E. R. SHENK ET AL 2,534,388

AUTOMATIC CODE SIGNAL DISCRIMINATING DEVICE

Filed Oct. 29, 1949 6 Sheets-Sheet 3

INVENTORS
EUGENE R. SHENK AND
JAMES C. PHELPS
BY [signature]
ATTORNEY

AUTOMATIC CODE SIGNAL DISCRIMINATING DEVICE

Filed Oct. 29, 1949 6 Sheets-Sheet 4

INVENTORS
EUGENE R. SHENK AND
JAMES C. PHELPS
BY Harry Tunick
ATTORNEY

Dec. 19, 1950 E. R. SHENK ET AL 2,534,388

AUTOMATIC CODE SIGNAL DISCRIMINATING DEVICE

Filed Oct. 29, 1949 6 Sheets-Sheet 5

INVENTORS
EUGENE R. SHENK AND
JAMES C. PHELPS
BY [signature]
ATTORNEY

Dec. 19, 1950 E. R. SHENK ET AL 2,534,388

AUTOMATIC CODE SIGNAL DISCRIMINATING DEVICE

Filed Oct. 29, 1949 6 Sheets-Sheet 6

INVENTORS
EUGENE R. SHENK AND
JAMES C. PHELPS
BY Harry Tunick
ATTORNEY

Patented Dec. 19, 1950

2,534,388

UNITED STATES PATENT OFFICE 2,534,388

AUTOMATIC CODE SIGNAL DISCRIMINATING DEVICE

Eugene Richard Shenk, Fairlawn, and James Curtis Phelps, Woodcliff Lake, N. J., assignors to Radio Corporation of America, a corporation of Delaware Application October 29, 1949, Serial No. 124,318

11 Claims. (Cl. 178—26)

Figure 1:
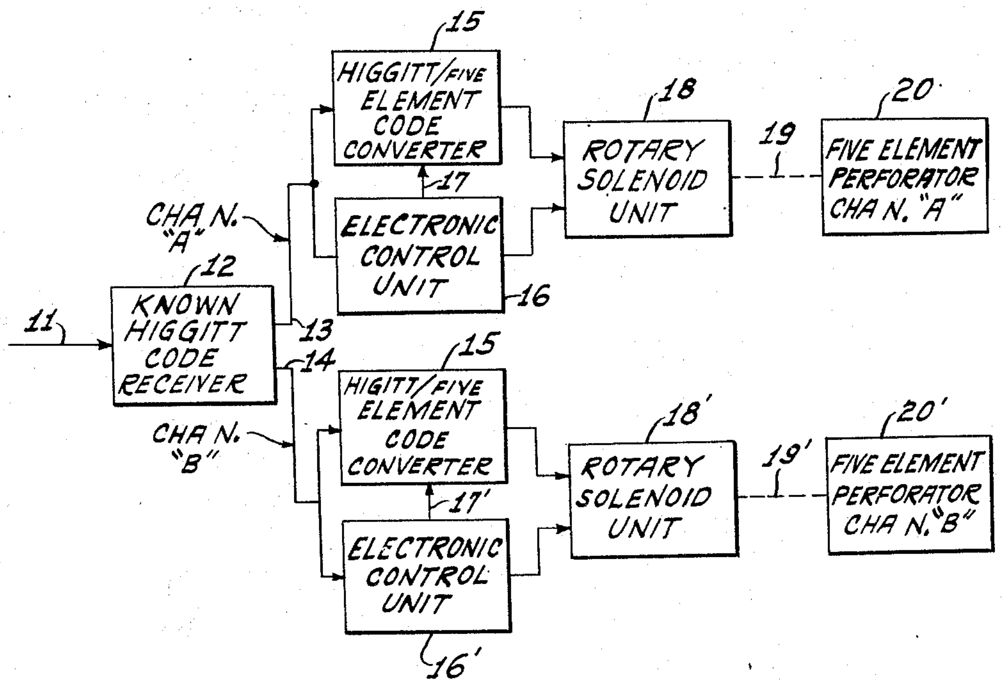

The invention relates to electronic circuits for automatically translating communication signals or messages expressed in a prearranged code, and particularly to such circuits for automatically producing suitable operating pulses for the control of relay counting chain and associated perforator for producing a perforated tape in response to received code signals.

There has existed for many years a system of radio telegraph communications known as the "Higgitt" system of operation. The essence of this type of transmission is that, while using characters of the Continental Morse Code, the dot and dash elements thereof are of opposite polarity (similar to Cable Code) and hence, can be and are of equal time duration. An arrangement for the automatic translation of International Morse Code and other random length code signals employing an electronic control unit is described in copending U. S. application, Serial No. 709,992, filed November 15, 1946. The invention enables the automatic translation by electronic means of the Higgitt type of signal, which requires a more critical cooperation with associated apparatus.

The Higgitt code employs equal length signal elements of opposite polarity occurring in a specific time relationship corresponding to the dots and dashes of Continental Morse Code for the various code combinations or characters comprising the letters of the alphabet, figures, and special symbols. Each "dot" and "dash" element is equivalent to a single elemental time interval, the relative time of occurrence of the element being relied upon for distinction. Since the elements, even though of equal length, correspond to the dots and dashes of Continental Morse Code they will be so referred to hereinafter. The elements are separated by spaces whose duration determines whether or not the preceding and succeeding character elements constitute part of a single character, separate characters or separate groups of characters (words). Because it is convenient in the design of code handling apparatus to consider the requirements therefor in terms of the shortest period of time allowed by the overall system for proper operation of the system, the description of the invention will be based on the theoretical time period of the basic marking element of the code under consideration, which time element will be referred to hereinafter as the B. M. E. A space of 1 B. M. E. duration represents an inter-character space, while a space of 3 or more B. M. E. represents a word space. The letters and figures of the Higgitt code, like the Morse code, are made up of unequal length code combinations of dots and/or dashes. The printer code on the other hand employs equal length code combinations for every letter of the alphabet and for every symbol. The code combinations of a printer code are composed of a plurality of equal length units or elements. The most common printer code employs 5 elements for every code combination, although there are other printer codes employing six, seven, or more units for each code combination.

The conventional Higgitt receiver accepts the incoming opposite polarity signals, rectifies them and delivers them to a utilization device via separate dot and dash lines, properly timed with respect to each other and of the same polarity. The customary utilization device now in use is a tape printer known to the art as a "Warburton Printer" which produces a printed tape well known in telegraphic circles. The usual requirement of transcribing this printed tape into a five-unit printer code is performed by manual operation of a key board tape perforator. Such an arrangement requires one or more operators, thus increasing the cost of operation, and in addition is likely to introduce errors due to the human equation.

It is known that to convert Higgitt code signals into printer code signals by purely mechanical means, would require apparatus that is both complicated and costly. Further, such a mechanical code converting arrangement would require a reperforated tape for its controlling means.

An object of the present invention is to provide a method of and means for automatically producing perforated telegraphic printer code tape directly from Higgitt code telegraphic signals.

Another object of the invention is to produce perforated telegraphic printed code tape from Higgitt code signals by mechanical and electronic means without the use of a human operator for reading the signals and perforating the tape.

A further object of the invention is to perform a code translation from Higgitt code to equal length printer code by the use of electromechanical relays and simple electronic circuits, thereby avoiding intricate mechanical assemblages and errors due to the human equation.

Still another object of the invention is to provide a source of controlling electronic impulses so timed in occurrence and duration as to be of maximum effectiveness when used with a cooperating relay chain or converter.

Yet another object of the invention is to provide a source of electronic control impulses so timed in occurrence and duration as to obtain the greatest operating tolerance when used with a cooperating tape perforator.

Still a further object of the invention is to provide automatic case shift sending for reception of random length code signals.

These and other objects of the invention which will appear as the specification progresses are attained by apparatus which receives Higgitt code telegraphic signals, rectifies the same, actuates various electronic trigger circuits in response to these rectified signals, sorts the Higgitt code signals into inter-element spaces, inter-letter spaces and inter-word spaces by a gating operation and actuates a relay chain and printing and perforating mechanism to produce a converted code tape directly.

Figure 2A:
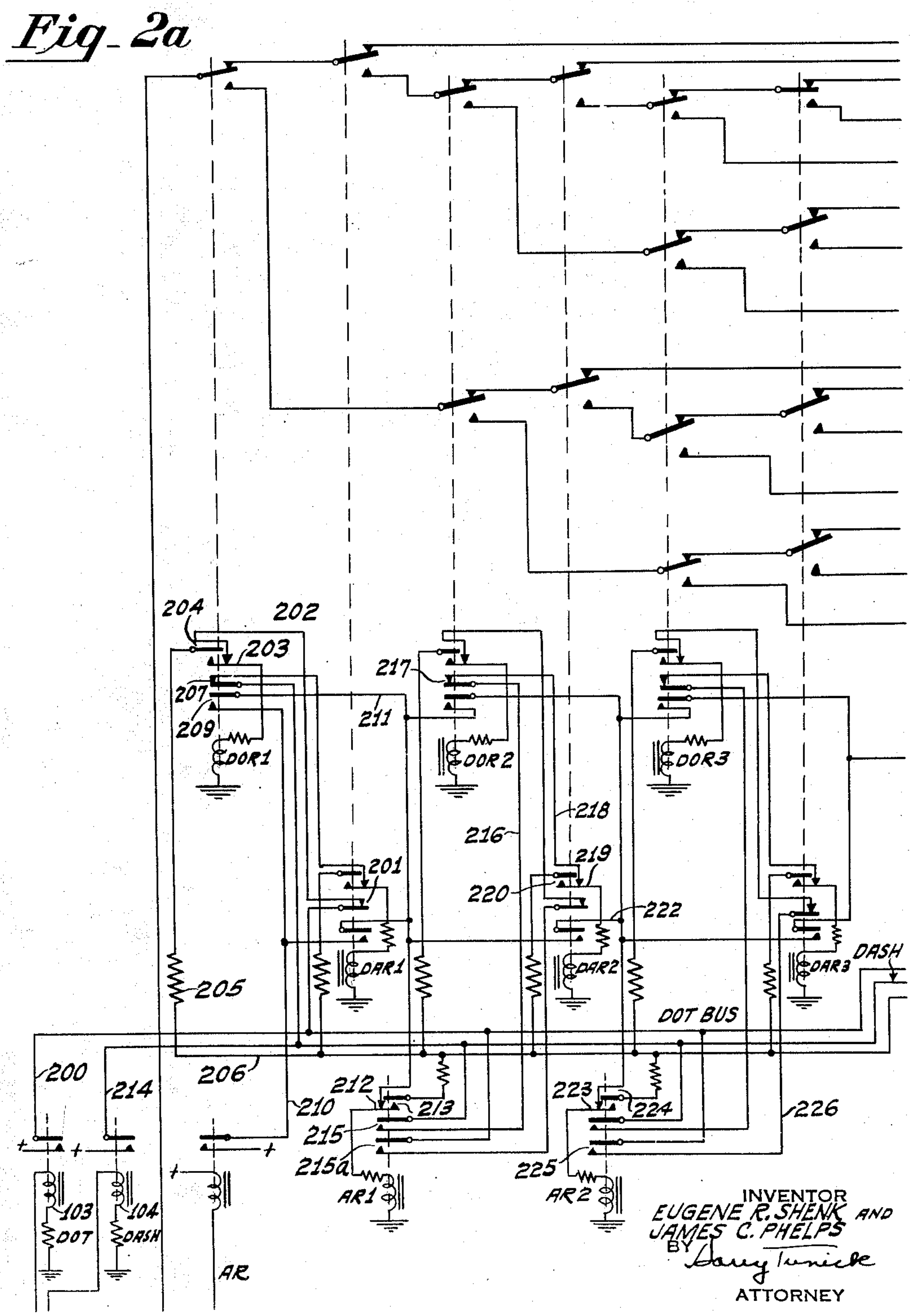
Figure 2B:
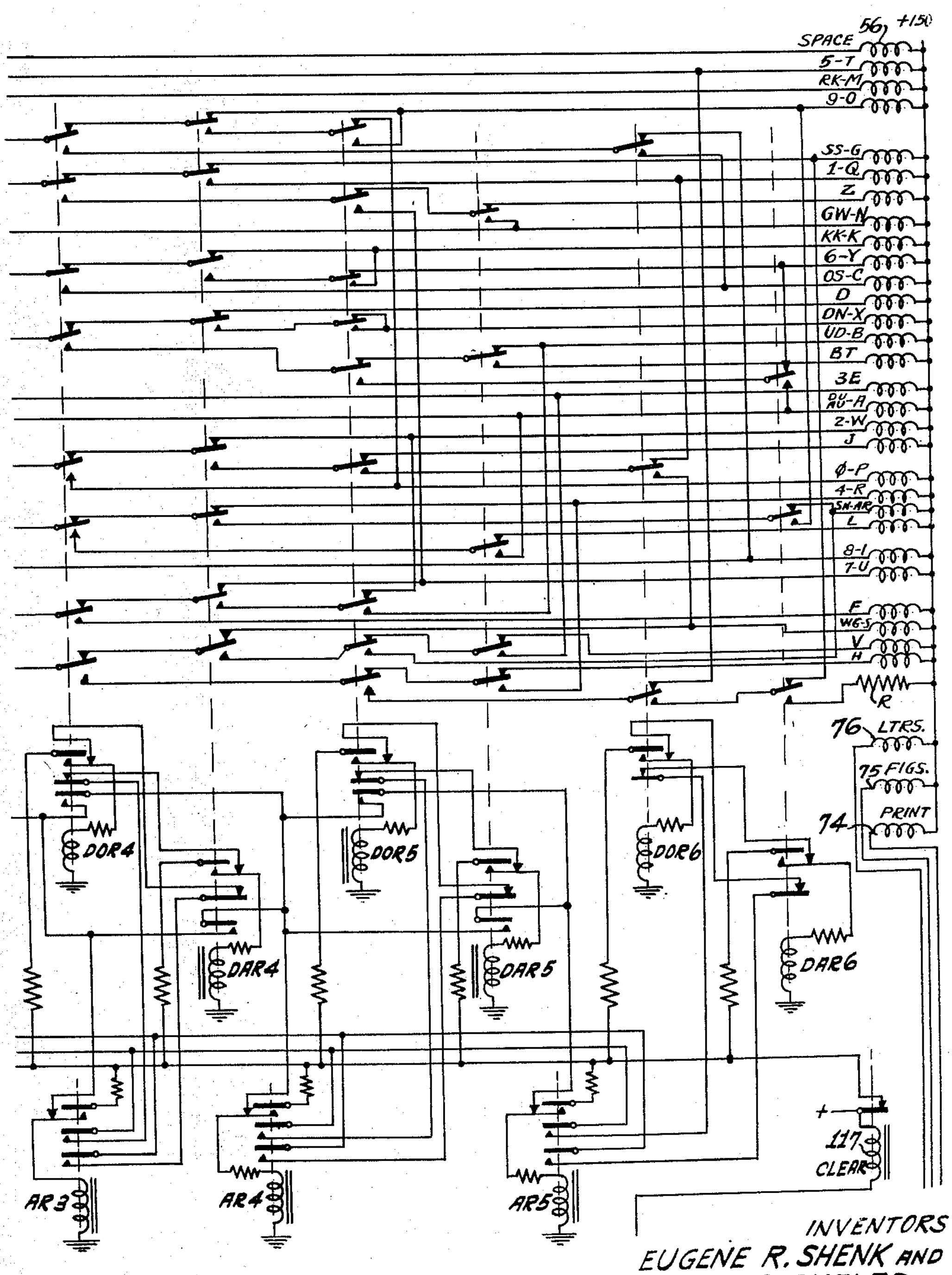
Figure 2C:
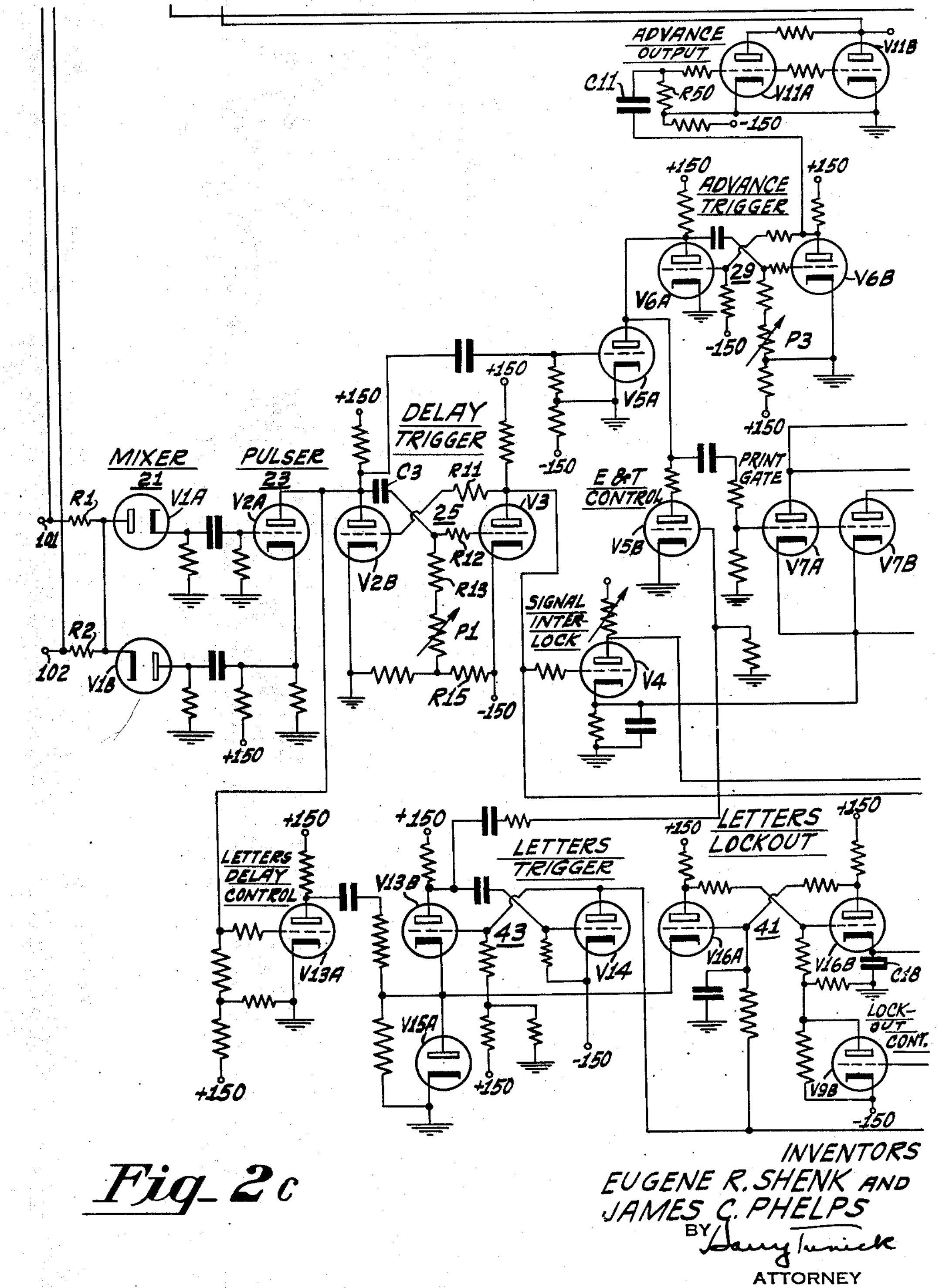
Figure 2D:
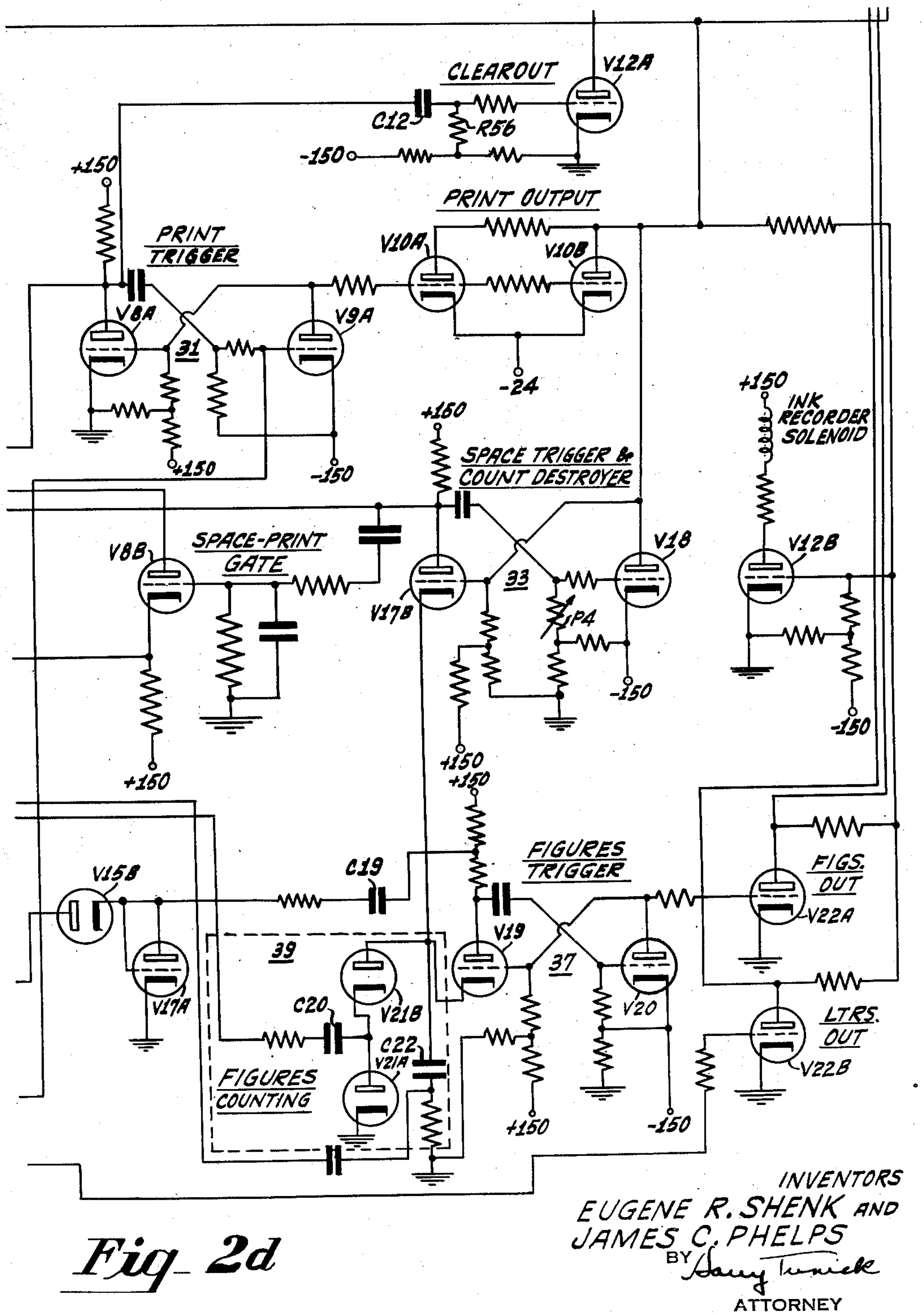
Figure 3:
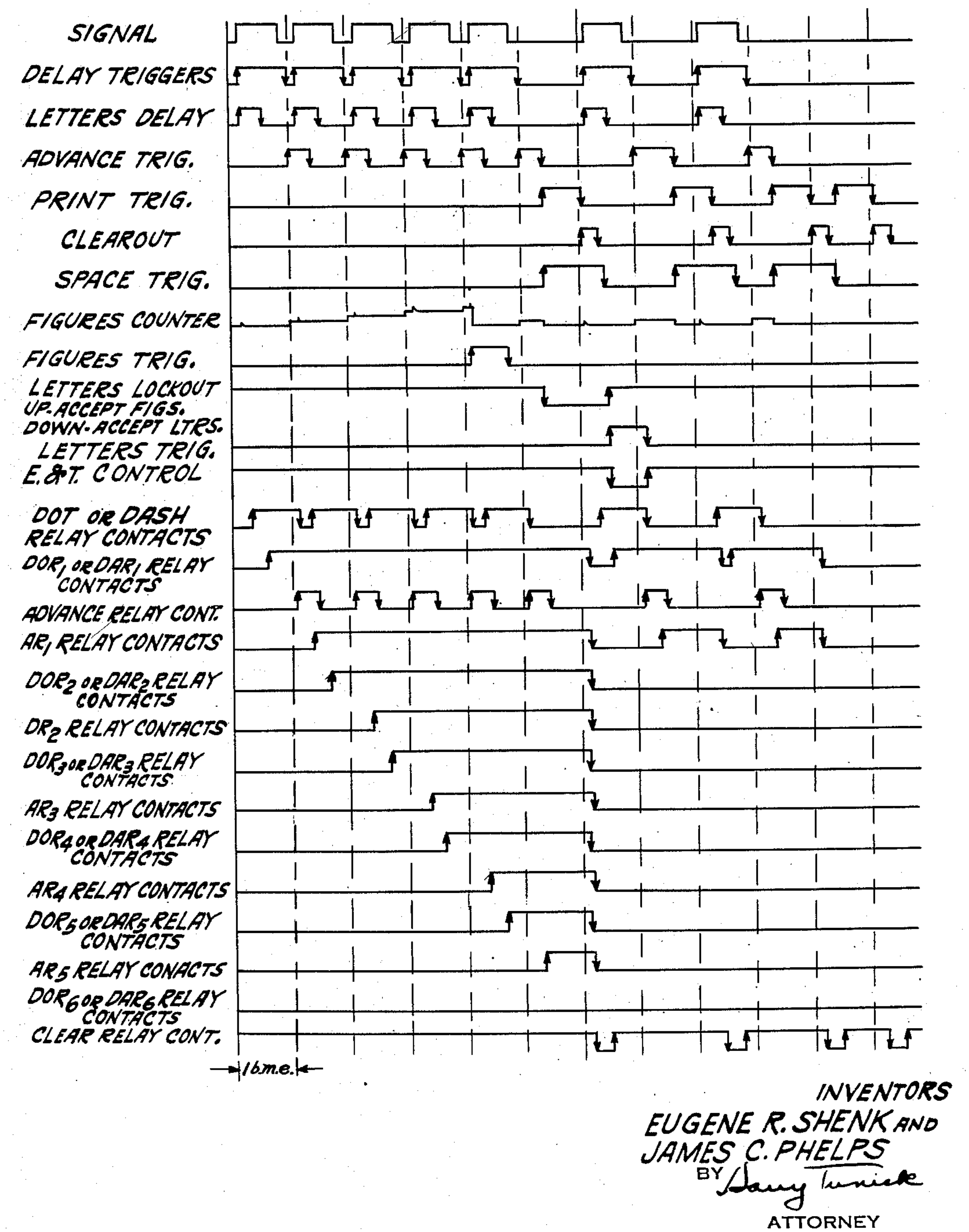

A more detailed description of the invention follows with reference to the accompanying drawing forming a part of the specification and wherein:

Fig. 1 is a block diagram of a circuit arrangement according to the invention;

Fig. 2 (Figs. 2*a*, 2*b*, 2*c*, and 2*d* taken together) illustrates an electronic control circuit for use in one channel of the arrangement shown in Fig. 1; and Fig. 3 is a phase diagram of the control system of Fig. 2, given for the purpose of explanation.

Referring to Fig. 1, there is shown a block diagram of an arrangement for receiving signals in Higgitt code and translating them into 5-element fixed length code for subsequent use. Incoming signals received on line 11 in general comprise two separate but interlaced signal trains which are applied to a known Higgitt code receiver 12 for separation. The output of such a receiver is usually designated as channel A, channel B, and so on, the output of each channel being presented at separate output terminals for dot elements and dash elements. The train of signal elements is applied via line 13 to a Higgitt-to-5-element code converter arrangement 15 hereinafter to be more completely described but which for the purpose of explanation at this point can be considered as a sequentially actuated chain of relays having the associated contacts and other apparatus arranged and interconnected in a plurality of possible electric paths and to complete one and only one such electric path in accordance with the combination of presented elements of the signal under consideration. Sequencing of code converter 15 is accomplished by means of an electronic control unit 16 according to the invention which responds to the number and timing of elements of the signal under consideration to produce pulses of current for controlling converter 15 and other incidental operations required of the apparatus later to be described in detail. Preferably, code converter 15 and control unit 16 are connected to a rotary solenoid unit 18 where a certain electromagnet corresponding to the signal under consideration is energized after which magnets corresponding to print, carriage shifts, and other functions are energized, to actuate desired mechanical code handling apparatus such as a five element perforator 20. While it is preferred for convenience to utilize a rotary solenoid unit which in its simplest form is merely a bank of magnets having armatures positioned to be conveniently linked to type bars and the like of existing code handling apparatus, the invention is by no means limited to such an arrangement but on the contrary, the solenoids of a teletypewriter, reperforator, and the like, can be directly connected to code converter 15 and control unit 16 in a manner obvious to one skilled in the art.

Referring to Fig. 2, there is shown in schematic form a circuit arrangement including an electronic unit 16 consisting of gating, trigger, locking and amplifier circuitry in such array as to provide the operating and control pulses to the relay counting chain of code converter 15, rotary solenoid unit 18, and perforator 20, so timed and of such duration as is required by the cooperating component. Means to vary this timing, as well as the duration and magnitude of the pulses is included where it is deemed necessary and/or desirable.

Details of the circuitry will become evident from the following description of the functioning of code converter 15 and control unit 16. The arrangement of code converter 15 can be readily understood from an inspection of Figs. 2*a*, 2*b*, which shows a portion of the chain of relays constituting code converter 15 and also shows other relays actuated by an electronic circuit 16 for changing from lower case (letters) to upper case (figures). The complete circuit of code converter 15 is shown in copending U. S. application Serial No. 709,992 to which reference has been made hereinbefore. There are six dot relays DOR1 to DOR6 inclusive and six dash relays DAR1 to DAR6 inclusive. These relays constitute a counting chain. Relay DOR1 and dash relay DAR1 from one pair of relays in the counting chain, and relay DOR2 and relay DAR2 form another pair in the counting chain, and so on, up to relay DOR6 and relay DAR6, which form the last pair in the counting chain. There is also provided another chain of relays, relay AR1 through relay AR5, forming an advance relay chain which is, in effect, a stepping relay causing the dot or dash signals to be switched from one pair of relays in the dot and dash chain to the next pair of relays in the chain. The relays DOR1 through DOR6 are operated from the contacts of the dot relay 103, while the relays DAR1 through DAR6 are operated from the contacts of the dash relay 104.

Input signal elements, that is, the separated dots and dashes from receiver 12 are simultaneously applied to both code converter 15 and electronic control unit 16 at terminals 101, 102. Dot elements applied at terminal 101 are then applied to the winding of dot relay 103 which operates every time a dot marking signal has been identified and, correspondingly, dash relay 104 operates every time a dash marking signal has been identified and applied to terminal 102, while advance relay AR operates each time a marking signal, whether dot or dash, has occurred. Dot relay 103 and dash relay 104 operate with every dot or dash respectively, while advance relay AR operates during the inter-element spacing, following either a dot or a dash element.

The operation of DOT relay 103 closes its associated contacts and causes the application of a positive potential to lead 200 (hereinafter referred to as the DOT BUS) and this positive potential follows a path through break (interlocking) contacts 201 of relay DAR1, lead 202, and make-before-break contacts 203 to the winding of relay DOR1, thus energizing relay DOR1 and causing this relay to lock up over its make contact 204 and open the break contacts 203. The contact 204, for locking relay DOR1 in its operative position, is connected through a resistor 205 to bus 206 which in turn is connected to a source of positive potential through the break contacts of Clear relay 117. It should be noted that this common lead or bus 206 furnishes the locking or holding potential for all of the relays DOR1 through DOR6, DAR1 through DAR6, and AR1 through AR5.

Alternatively, the operation of DASH relay applies positive potential to line 214 (hereinafter referred to as the DASH BUS), which potential finds a path through a lead to break (interlock) contacts 207 of relay DOR1, a make-before-break contact of relay DAR1 and to the winding of relay DAR1.

This relay locks up to bus 206 in a manner similar to that described above for DOR1. It is to be noted that either DOR1 or DAR1 alone can be operated but not both simultaneously due to the respective interlock contacts 201 or 207 opening the path to the other's winding. If it be assumed that DOR1 is operated, a make contact 209 associated therewith is closed, thus completing a path from the contacts of relay AR, lead 210, contacts 209 of relay DOR1, lead 211, make-before-break contacts 212 of relay AR1 and to the winding of relay AR1. Thus when relay AR is operated at the end of the first marking element, it causes the operation of relay AR1, which locks up and holds through make-contact 213 to common bus 206.

The operation of relay AR1 closes contacts 215*a*, thus completing a path from the DOT BUS to the winding of relay DOR2 so that if the second marking element of a successive signal train caused DOT relay to operate, then DOR2 relay would respond to this operation. In a like manner, if it had been assumed that DAR1 relay was operated (vice DOR1), relay AR1 would have been similarly operated to close contacts 215, tieing relay DAR2 to the DASH BUS.

Restated, the appearance of either a dot or a dash as the first marking element in a successive signal train has caused the operation and lock-up of either DOR1 or DAR1, as the case may be, and upon the cessation of that first marking element, has caused AR1 to operate and lock-up, thus preparing relays DOR2 and DAR2 to be responsive to the appearance of the second marking element in that successive signal train. In like manner operation progresses or advances in succession through DOR2 or DAR2 to AR2, DOR3 or DAR3 to AR3, DOR4 or DAR4 to AR4, DOR5 or DAR5 to AR5, and finally into DOR6 or DAR6.

Since by international convention no character involves more than 6 marking elements, the chain ends at the 6th instance, although of course any number of such stages can obviously be incorporated into a circuit of this type.

The operation of any of the DOR or DAR relays performs required switching operations through the medium of associated contacts (shown connected by slotted lines to associated relays in Figs. 2*a* and 2*b*). As a consequence of this switching, a single specific solenoid 56 is energized corresponding to the selection established and hence a translation has occurred. If a more complete description of the operation of this code converter is desired, reference should be made to the above mentioned copending application, Serial No. 709,992.

At the same time as input signal elements are applied to the relay chains, the same input signal elements for one communication channel, that is, separated dots and dashes, delivered by receiver 12, are applied to electronic control unit terminals 101, 102, as shown in Figs. 2*c* and 2*d*, and immediately mixed through isolation resistor R1 and R2. This is done because segregated elements demanded by the relay counting chain are not necessary for the proper functioning of the electronic control unit 16.

The potential of this recombined signal appears simultaneously on the anode of diode V1A and the cathode of diode V1B of Mixer circuit 21, so that regardless of signal polarity (which, for the purpose of preserving relay contacts, is reversed each operating day) a Pulser circuit 23 comprising a triode V2A is pulsed conducting at the leading edge of each signal element.

Pulsing of triode V2A activates the delay trigger 25 comprising triodes V2B and V3, which operates in the conventional trigger manner, restoring in a time which can be adjusted by potentiometer P1.

This trigger circuit, as well as others to follow, has one degree of electrical stability; namely, a stable state in which tube V3 is normally conducting and tube V2B non-conducting, and an active state in which tube V3 is non-conducting and tube V2B conducting. The time duration in which the trigger circuit 25 remains in its active state is determined to a large extent by the time constant of the network formed by capacitor C3 and associated resistors, the more important of which are R13 and P1.

At the instant of restoration of the Delay trigger 25 a positive pulse is passed to triode V5A which at once activates Advance trigger 29 comprising tubes V6A and V6B, which also operates in the usual manner, restoring in a time interval under control of a potentiometer P3.

Activation of Advance trigger 29 causes Advance output triodes V11A and V11B to become conducting to energize advance relay AR (Fig. 2*a*) until Advance trigger 29 is restored or sooner if so determined by the time constant of capacitor C11 and associated resistor R50.

As explained before, Advance relay AR is operated once for each signal element, and it becomes operated after a time determined by Delay trigger 25, and stays operated for a time determined by Advance trigger 29.

It should be noted that the anode potential of tube V6A is normally held at a reduced value due to the "bleeding" action of an E and T Control triode V5B which is maintained in a conducting state under normal conditions. Should E and T Control triode V5B become non-conducting it would cause the anode potential of triode V6A to rise to a value higher than normal resulting in a correspondingly increased time duration for Advance trigger 29. This increased time factor is a desirable function under certain signal conditions as will be explained hereinafter.

At the instant of restoration of the Advance trigger 29, a positive pulse obtained from the anode of tube V6A is applied to gating triodes V7A and V7B, Print gate V7A immediately activating Print trigger 31. Gating triodes V7A, V7B and V8B are either conducting or blocked in accordance with the magnitude and polarity of the potentials applied to the electrodes. When the triodes are conducting the gates are "open" or active, and when they are cut off or blocked, the gates are "closed" or inactive. The activation of Print trigger 31 causes output triodes V10A and V10B to become conducting, thus passing a "print" pulse through the selective circuits of the converter relay chain to operate the selected solenoid 56 (Fig. 2*b*), causing that solenoid to be energized and pull down a key of the cooperating perforator, holding that key depressed until Print trigger restores.

At the instant of restoration of Print trigger 31, a positive pulse is applied to Clearout output triode V12A which conducts and energizes relay 117 for a period of time determined by the time constant of capacitor C12 and resistor R56 in the grid circuit of Clearout output triode V12A.

It is apparent from the foregoing that, as thus far discussed, under the influence of each leading impulse of a signal element, either dot or dash, the following chain of events takes place:

A. Advance relay AR is energized once.

B. Print rotary solenoid 77, operating the associated perforator print magnet, is next energized once.

C. Clearout relay 117 is energized once.

Obviously, the print and clearout functions are useful in this sequence only when the received character consisted of a single marking element; that is, either an "E" or a "T." On any multiple element character the operation of Print solenoid 56 and Clearout relay 117 must be nullified until the complete character has been received, as indicated by a spacing or no-signal interval following the character group. A Signal Interlock triode V4 performs this nullifying function in the manner hereinafter described.

At the instant Delay trigger 25 is activated, the anode of triode V3 becomes relatively positive causing Signal Interlock triode V4 to conduct, effectively to apply a relatively positive potential to its cathode.

Since the cathode of triode V4 is directly connected to the cathode of Print Gate triode V7A, the latter is held in blocked condition, and hence the effect of any pulse obtained from Advance trigger 29 would be nullified if it were applied to the grid of gate triode V7A during the time the cathode was at relatively positive potential. However, because of the delays due to Delay trigger 25 and Advance trigger 29, the pulse obtained from Advance trigger 29 does not arrive on the grid of gate triode V7A until after the second marking pulse has swung the cathode of triode V7A positive. Restated, it is the immediately following signal impulse which nullifies its predecessor's attempt to activate Print trigger 31. Obviously, if there is no subsequent signal impulse the last impulse received is utilized to energize print solenoid 56 and the associated mechanism of the perforator. Therefore, Print solenoid 56 and Clearout relay 117 operate only once for each character group of signal elements regardless of the number of elements in that group, but Advance relay 117 operates once for each element of the group.

It has been shown that, in the first no-signal interval following a character group, Print trigger 31 is activated, thus effectively causing the associated perforator to punch the tape in accordance with the character under consideration. Should this spacing interval endure for two or more B. M. E., as in the spacing interval between words, it would then be necessary for the perforator to record the word space as a distinct punching. This is accomplished as hereinafter described.

The activation of the Space trigger 33 is controlled by Space Gate triode V7B in the same manner and at the same time as Print Gate triode V7A controlled the Print trigger 31. However, the restoration timing of Space trigger 33 is purposely made longer than the restoration time of Print trigger 31, so that as it restores it will attempt to refire Print trigger by activation of Space-Print gate triode V8B. Since the cathode of triode V8B is also controlled by the Signal Interlock cathode potential, this refiring of Print trigger can only take place when there is no signal present or a space condition.

To restate the foregoing, Space trigger 33 is activated every time Print trigger 31 is activated, at the first spacing interval following a marking interval. If this period of no signal endures for approximately 25 per cent of a B. M. E., Print trigger is fired thus printing and clearing out any accumulated selection in the relay train. If this spacing condition continues to endure for still another B. M. E. or more, Space trigger restores and in doing so refires Print which in operating finds no selection in the relays and so activates the Space solenoid of the perforator.

The necessity for figures and letters shift on the conventional keyboard perforator makes the provision of such functional control impulses imperative. In the Morse and Higgitt codes, any group of more than four signal elements is recognized as a number or punctuation mark and calls for a case shift. A Figures trigger 37 is arranged to make this element count and be activated immediately at the start of any fifth consecutive marking element in a manner hereinafter explained.

Each time Delay trigger 25 restores, the anode of triode V3 becomes relatively negative and a pulse is applied to diode V21B of Figure Counting circuit 39, causing it to become conducting momentarily. When diode V21B conducts an increment of charge is applied to and stored in capacitor C22. The amount of this incremental charge is determined by circuit constants having values at which the resultant of a predetermined number of increments, in this instance four successive increments, accumulated on capacitor C22 would be just under the potential required to cause triode V19 to conduct and five such increments would surely cause that tube to conduct. For purposes of the discussion to follow, it will be considered that each increment is one-fifth of the cathode potential at which triode V19 becomes conducting.

Each time Signal Interlock triode V4 becomes conducting the anode thereof becomes relatively negative and a negative pulse is applied to the cathode of triode V19, the potential of which pulse is considerably less than the total required tripping or activating potential. Again, for discussion purposes only, it will be assumed that the magnitude of this pulse is equivalent to one-fifth of the cathode potential at which triode V19 becomes conducting.

From the foregoing, it can be seen that in response to each and every character element there will be two pulses of current applied to triode V19 in an attempt to activate Figures trigger 37.

In time sequence, the first pulse to arrive will be that obtained from Signal Interlock triode V4 occurring at the leading edge of each signal element. Note, however, that this pulse is of short duration and is not stored or accumulated in capacitor C22. Next to arrive will be the pulse from triode V3 of Delay trigger 25 occurring at the restoration of Delay trigger 25. In this case the charge is stored in capacitor C22 permitting accumulation. When, as in the instant case, four signal elements have deposited a total of four-fifths of the potential required to activate Figures trigger 37, the pulse obtained at the start of the fifth pulse will supply the required additional one-fifth cathode potential charge and triode V19 will become conducting, causing Figures trigger 37 to trip or be activated.

At the instant Figures trigger 37 is activated, Figures output triode V22A becomes conducting and energizes the Figures solenoid 75 cooperating with the perforator to punch a "figures" combination in the tape. Coincident with the activation of Figures trigger 37, a pulse is applied to and stored on capacitor C18 through diode V15B. The potential attained on C18 is insufficient to cause triode V16B to conduct as this tube is held inoperative by the normally conducting state of Lockout Control triode V9B. However, when Lockout Control triode V9B is blocked—as it is every time Print trigger 31 is activated—the coincidence of a negative charge on capacitor C18 and a lessened negative potential on the grid of V16B permits V16B to conduct, which action immediately causes triode V16A to be blocked in the conventional locking circuit manner.

With triode V16A conducting, Letters trigger 43 can be operated as will be explained later.

It must be remembered that the functions gone through to accomplish this figures shift have not interfered with the normal regular action of Advance relay AR, Print solenoid 56 or Clearout relay 117. Therefore, as soon as a space interval appeared in the signal element train (even though five or six consecutive elements—or even more—were involved) the perforator was operated to punch the appropriate character combination.

It is desirable to point out here, also, that had the character elements been anything less than five followed by a no-signal interval of one B. M. E. or more, the accumulated charge in capacitor C22 would have been dissipated when Space trigger triode V17B became conducting since cathodes of triodes V17B and V19 are interconnected.

Having obtained the necessary control impulses to accomplish figures shift and character print functions, there is immediate need of a "letters" function, inasmuch as there is no way (without storage in some manner) whereby the case of the next character can be foretold. It must be assumed to be a letter until the start of the fifth element. This required "letters" function is obtained as explained below.

Each time Delay trigger 25 is activated, a negative pulse is applied to Letters Delay control triode V13A blocking it from its normally conducting state. When triode V13A again becomes conducting, after a time interval determined by the time constant of its grid circuit, a negative pulse is applied to the cathode of triode V13B of a Letters trigger 43 causing it to conduct, which trigger circuit functions in the manner previously described.

At the instant Letters trigger 43 is activated, the anode of triode V14 becomes relatively more positive causing Letters Output triode V22B to become conducting, permitting the letters solenoid 76 mechanically linked to the cooperating perforator to be operated, thereby punching a "letters" combination in the tape.

Also at the instant Letters trigger 43 becomes conducting, the positive swing of anode potential on triode V14 causes Lockout triode V16A to conduct, cutting off triode V16B in the conventional locking circuit manner.

Again, at the instant Letters trigger 43 is activated, the anode of triode V13B becomes relatively negative, applying a negative pulse to an E and T Control triode V5B, blocking the same and causing the anode potential of triode V6A of Advance trigger 29 to rise, resulting in an increased time duration for Advance trigger 29.

The required increased time delay in Advance trigger 29 is a function of the keying speed of transmission and is incorporated to give more operating time to the cooperating perforator, which, due to inherent mechanical features, has a safe top operating speed of about 900 operations per minute. With this E and T Control feature, that is, an extension of the normal duration of Advance trigger active period, coming immediately after each time the letters function is required, the resultant print function is delayed long enough to get the perforator clear of its letters punching operation. As this close print requirement occurs only when a single element character (that is, and "E" or "T") follows a figure or punctuation mark, the control is called E and T Control. Its function is to reduce the maximum instantaneous speed requirement of the perforator.

With Lockout triode V16A in its normal conducting state, the anode current flowing through diode V15A causes this diode to present a few hundred ohms of resistance to all tripping pulses obtained from Letters Delay Control triode V13A. Hence, Letters trigger 43 does not become active unless the Lockout triode V16A has been blocked due to a figures action activating triode V16B as hereinbefore explained.

Summarizing the foregoing description, it can be seen that the electronic unit according to the invention supplies the following impulses:

A. An Advance pulse for every marking signal element, and having an extended time duration on the first marking element follows a Letters pulse.

B. A Figures pulse starting at the start of the fifth consecutive marking element of any one character group.

C. A Print pulse occurring during the first B. M. E. of any no-signal interval following a character group.

D. A second Print pulse (or Space pulse) occurring during the second B. M. E. of any no-signal interval following a character group.

E. A Clearout pulse immediately following the completion of every print pulse.

F. A Letters pulse initiated by the first marking element of the character selection following the printing of an upper-case character.

An Ink Recorder triode V12B has been included in the arrangement as a means of monitoring the time occurrence and duration of the Print-Figures-and-Letters impulses. Whenever any of the output tubes governing these functions becomes conducting, V12B is blocked. With the operate coil 177 of an indicating instrument, such as an ink recorder, in the anode circuit of triode V12B, a record of these functions for analysis is automatically made.

Fig. 3 illustrates in graphical form the time relationships between the various impulses correlated to the basic marking element as mentioned in the foregoing description, an arrow up indicating a trigger being activated, and an arrow down, a trigger being restored.

While the invention has been described in terms of an express embodiment thereof, it is to be understood that many modifications will be obvious to one skilled in the art without departing from the spirit and scope of the invention.

APPENDIX

In a constructed embodiment of the invention the following components were used:

*Vacuum tubes*

| | |
|---|---|
| V1A, V1B | ½ 6H6 |
| V2A, V2B | ½ 6SN7 |
| V3, V4 | 6J5 |
| V5A, V5B, B6A, V6B | ½ 6SN7 |
| V7A, V7B | ½ 6SL7 |
| V8A, V8B, V9A, V9B | ½ 6SN7 |
| V10A, V10B | ½ 6AS7 |
| V11A, V11B, V12A, V12B, V13A, V13B | ½ 6SN7 |
| V14 | 6J5 |
| V15A, V15B | ½ 6H6 |
| V16A, V16B | ½ 6SN7 |
| V17A, V17B | ½ 6SL7 |
| V18, V19, V20 | 6J5 |
| V21A, V21B | ½ 6H6 |
| V22A, V22B | ½ 6AS7 |

*Capacitors*

| | Microfarads |
|---|---|
| C3 | 0.02 |
| C11 | 0.03 |
| C12 | 0.025 |
| C18 | 0.1 |
| C22 | 0.07 |

*Resistors*

| | |
|---|---|
| P1, P3 (log taper) | 500K ω |
| R1, R2 | 100K ω |
| R13 | 750K ω |
| R50 | 180K ω |
| R56 | 470K ω |
| R72 | 100K ω |

The invention claimed comprises:

1. An electronic circuit arrangement for producing coordinated utilization pulses in response to received pulsations comprising elements of different nature representing characters of a prearranged random length code, comprising trigger, delay, interlock and gate circuits arranged in concatenated series relationship to produce a first utilization pulse corresponding to each marking element, a second utilization pulse corresponding to a marking element preceding an intercharacter space and a third utilization pulse following said second utilization pulse by a predetermined time interval, a delay circuit and a further trigger circuit arranged to produce a first complementary utilization pulse when the number of marking elements is less than a predetermined number of marking elements, a counting circuit arranged to count the number of marking elements received for each character under consideration, a trigger circuit adapted to be activated in response to said counting circuit counting said predetermined number to produce a second complementary utilization pulse, further delay, gate and trigger circuits arranged to destroy said count and to reproduce said second utilization pulse after a spacing interval longer than an interelement space, a locking circuit arranged to prevent production of an undesired one of said complementary utilization pulses when the other is required, and a control circuit arranged to extend the period of activation of said means producing said first utilization pulse upon sequential production of said second complementary, said second, and said first complementary utilization pulses.

2. An electronic circuit arrangement for producing coordinated utilization pulses in response to received pulsations comprising marking and spacing signal elements representing characters of a prearranged random length code, comprising cascaded trigger circuits responsive to received marking elements to produce a first utilization pulse for each marking element, a further trigger circuit and an interlock circuit coupled to said cascaded circuits to produce a second utilization pulse corresponding to a marking element preceding an intercharacter space, a delayed control circuit coupled to said further trigger circuit to produce a third utilization pulse following said second utilization pulse by a predetermined time interval, a further cascaded delay circuit and trigger circuits responsive to received marking elements potentially to produce a first complementary utilization pulse, a counting circuit responsive to received marking elements and arranged to provide the count of the number of marking elements for each character under consideration, a trigger circuit coupled to said counting circuit and adapted to be activated in response to a count of a predetermined number of marking elements potentially to produce a second complementary utilization pulse, further interlock, delay, gate and trigger circuits arranged to destroy said count and to reproduce said second utilization pulse after a spacing interval longer than an interelement space, a locking circuit arranged to prevent production of an undesired one of said potential complementary utilization pulses, when the other is required, and a control circuit coupled to both of said cascaded circuits and arranged to extend the period of said first utilization pulse upon sequential production of said second complementary, said second, and said first complementary utilization pulses.

3. An electronic circuit arrangement for producing electric pulses to be applied to a utilization device in response to received telegraph signals comprising equal length dot and dash marking signal elements in prearranged sequences corresponding to characters expressed in random length code, including a first self-restoring trigger circuit responsive to the start of every marking element, a second self-restoring trigger circuit responsive to the restoration of said first trigger circuit to produce a first electric utilization pulse of time duration determined by the natural period of said second trigger circuit, a normally open gate circuit coupled to said second trigger circuit, a third self-restoring trigger circuit coupled to said first gate circuit and responsive to the restoration of said second trigger circuit to produce a second electric utilization pulse, and a signal interlock circuit coupled to said first trigger circuit and coupled to said first gate circuit to close said first gate circuit in response to activation of said first trigger circuit by the succeeding marking signal element to prevent activation of said third trigger circuit where the marking signal element under consideration is followed by another marking signal element within the time period of the predetermined interelement spacing element.

4. An electronic circuit arrangement for producing electric pulses to be applied to a utilization device in response to received telegraph signals comprising equal length dot and dash marking signal elements in prearranged sequences corresponding to characters expressed in random length code, including a first self-restoring trigger circuit responsive to the start of every marking element, a second self-restoring trigger circuit responsive to the restoration of said first trigger circuit to produce a first electric utilization pulse of time duration determined by the natural period of said second trigger circuit, a normally open gate circuit coupled to said second trigger circuit, a third self-restoring trigger circuit coupled to said first gate circuit and responsive to the restoration of said second trigger circuit to produce a second electric utilization pulse, a signal interlock circuit coupled to said first trigger circuit and coupled to said first gate circuit to close said first gate circuit in response to activation of said first trigger circuit by the succeeding marking signal element to prevent activation of said third trigger circuit where the marking signal element under consideration is followed by another marking signal element within the time period of the predetermined interelement spacing element, and a time constant network coupled to said third trigger circuit to produce a third electric utilization pulse in response to the production of said second utilization pulse.

5. An electronic circuit arrangement for producing electric pulses to be applied to a utilization device in response to received telegraph signals comprising equal length dot and dash marking signal elements in prearranged sequences corresponding to characters expressed in random length code, including a first self-restoring trigger circuit responsive to the start of every marking element, a second self-restoring trigger circuit responsive to the restoration of said first trigger circuit to produce a first electric utilization pulse of time duration determined by the natural period of said second trigger circuit, normally open first and second gate circuits coupled to said second trigger circuit, a third self-restoring trigger circuit coupled to said first gate circuit and responsive to the restoration of said second trigger circuit to produce a second electric utilization pulse, a signal interlock circuit coupled to said first trigger circuit and coupled to said first and second gate circuits to block both gate circuits in response to activation of said first trigger circuit by the succeeding marking signal element to prevent activation of said third trigger circuit where the marking signal element under consideration is followed by another marking signal element within twice the time period of the predetermined interelement spacing element, a fourth self-restoring trigger circuit coupled to said second gate circuit, said fourth trigger circuit being activated in response to activation of said third trigger circuit and having an active period longer than the active period of said third trigger circuit, and means to couple said fourth trigger circuit to said third trigger circuit to reactivate said third trigger circuit upon restoration of said fourth trigger circuit.

6. An electronic circuit arrangement for producing electric pulses to be applied to a utilization device in response to received telegraph signals comprising equal length dot and dash marking signal elements in prearranged sequences corresponding to characters expressed in random length code, including a first self-restoring trigger circuit responsive to the start of every marking element, a second self-restoring trigger circuit responsive to the restoration of said first trigger circuit to produce a first electric utilization pulse of time duration determined by the natural period of said second trigger circuit, normally open first and second gate circuits coupled to said second trigger circuit, a third self-restoring trigger circuit coupled to said first gate circuit and responsive to the restoration of said second trigger circuit to produce a second electric utilization pulse, a signal interlock circuit coupled to said first trigger circuit and coupled to said first and second gate circuits to block both gate circuits in response to activation of said first trigger circuit by the succeeding marking signal element to prevent activation of said third trigger circuit where the marking signal element under consideration is followed by another marking signal element within twice the time period of the predetermined interelement spacing element, a fourth self-restoring trigger circuit coupled to said second gate circuit, said fourth trigger circuit being activated in response to activation of said third trigger circuit and having an active period longer than the active period of said third trigger circuit, a normally open third gate circuit coupled to said fourth trigger circuit and to said third trigger circuit to reactivate said third trigger circuit upon restoration of said fourth trigger circuit, and means interconnecting said signal interlock circuit to said third gate circuit to prevent reactivation of said third trigger circuit by restoration of said fourth trigger circuit where the marking signal element under consideration is followed by another marking signal element within twice the time period of the predetermined interelement spacing element.

7. An electronic circuit arrangement for producing a utilization pulse corresponding to a character of a prearranged telegraph signal train of a random length code having a predetermined number of marking elements, including a first self-restoring trigger circuit activated in response to applied marking signal elements, a charge storing circuit coupled to said first trigger circuit to store an increment of electric energy in response to restoration of said first trigger circuit, a second self-restoring trigger circuit coupled to said charge storing circuit, a signal interlock circuit coupled to said first trigger circuit and to said second trigger circuit, said interlock circuit being activated in response to the activation of said first trigger circuit to apply a tripping pulse of electric energy to said second trigger circuit, said second trigger circuit being activated upon application of said tripping pulse and the charge in said storing circuit attaining a value equal to said predetermined number of restorations of said first trigger circuit to produce said utilization pulse corresponding to a character having said predetermined number of marking elements.

8. An electronic circuit arrangement for producing complementary utilization pulses in accordance with a predetermined number of marking elements comprising a character of a prearranged telegraph signal train of a random length code, including a first self-restoring trigger circuit activated in response to applied marking signal elements, a charge storing circuit coupled to said first trigger circuit to store an increment of electric energy in response to restoration of said first trigger circuit, a second self-restoring trigger circuit coupled to said charge storing circuit, a signal interlock circuit coupled to said first trigger circuit and to said second trigger circuit, said interlock circuit being activated in response to the restoration of said first trigger circuit to apply a tripping pulse of electric energy to said second trigger circuit, said second trigger circuit being activated upon application of said tripping pulse and the charge in said storing circuit attaining a value equal to said predetermined number of restorations of said first trigger circuit to produce a first one of said complementary utilization pulses corresponding to a character having said predetermined number of marking elements, a normally active time delay circuit coupled to said first trigger circuit and arranged to be blocked in response to activation of said first trigger circuit for a predetermined period less than the time required for said predetermined number of marking elements to be applied, and a third self-restoring trigger circuit coupled to said time delay circuit and adapted to be activated at the end of said predetermined period to produce the second of said complementary utilization pulses.

9. An electronic circuit arrangement for producing complementary utilization pulses in accordance with a predetermined number of marking elements comprising a character of a prearranged telegraph signal train of a random length code, including a first self-restoring trigger circuit activated in response to applied marking signal elements, a charge storing circuit coupled to said first trigger circuit to store an increment of electric energy in response to restoration of said first trigger circuit, a second self-restoring trigger circuit coupled to said charge storing circuit, a signal interlock circuit coupled to said first trigger circuit and to said second trigger circuit, said interlock circuit being activated in response to the restoration of said first trigger circuit to apply a tripping pulse of electric energy to said second trigger circuit, said second trigger circuit being activated upon application of said tripping pulse and the charge in said storing circuit attaining a value equal to said predetermined number of restorations of said first trigger circuit to produce a first one of said complementary utilization pulses corresponding to a character having said predetermined number of marking elements, a normally active time delay circuit coupled to said first trigger circuit and arranged to be blocked in response to activation of said first trigger circuit for a predetermined period less than the time required for said predetermined number of marking elements to be applied, a third self-restoring trigger circuit coupled to said time delay circuit and adapted to be activated at the end of said predetermined period to produce the second of said complementary utilization pulses, and a flip-flop circuit coupled between said second and said third trigger circuits to prevent production of said first utilization pulse when the number of signal marking elements is less than said predetermined number when the preceding character had less than said predetermined number of marking elements and to prevent production of said second utilization pulse when the number of marking elements is greater than said predetermined number.

10. An electronic circuit arrangement for producing electric pulses to be applied to a utilization device in response to received telegraph signals comprising equal length dot and dash marking signal elements in prearranged sequences corresponding to characters expressed in random length code, including a first self-restoring trigger circuit responsive to the start of every marking element, a second self-restoring trigger circuit responsive to the restoration of said first trigger circuit to produce a first electric utilization pulse of time duration determined by the natural period of said second trigger circuit, a normally open first gate circuit coupled to said second trigger circuit, a third self-restoring trigger circuit coupled to said first gate circuit and responsive to the restoration of said second trigger circuit to produce a second electric utilization pulse, a charge storing circuit coupled to said first trigger circuit to store an increment of electric energy in response to restoration of said first trigger circuit, a fourth self-restoring trigger circuit coupled to said charge storing circuit, a signal interlock circuit coupled to said first trigger circuit and to said fourth trigger circuit, said interlock circuit being activated in response to the restoration of said first trigger circuit to apply a tripping pulse of electric energy to said fourth trigger circuit, said fourth trigger circuit being activated upon application of said tripping pulse and the charge in said storing circuit attaining a value equal to said predetermined number of restorations of said first trigger circuit to produce a first complementary utilization pulse corresponding to a character having said predetermined number of marking elements, a normally active time delay circuit coupled to said first trigger circuit and arranged to be blocked in response to activation of said first trigger circuit for a predetermined period less than the time required for said predetermined number of marking elements to be applied, a fifth self-restoring trigger circuit coupled to said time delay circuit and adapted to be activated at the end of said predetermined period to produce a second complementary utilization pulse, a flip-flop circuit coupled between said fourth and said fifth trigger circuits to prevent production of said first complementary utilization pulse when the number of signal marking elements is less than said predetermined number and when the preceding character had less than said predetermined number of marking elements and to prevent production of said second complementary utilization pulse when the number of marking elements is greater than said predetermined number, and a normally activated control circuit coupled to said third and said fifth trigger circuits to be blocked upon activation of said fifth trigger circuit and extend the activation period of said third trigger circuit upon sequential activation of said fourth trigger circuit, said third trigger circuit and said fifth trigger circuits.

11. An electronic circuit arrangement for producing electric pulses to be applied to a utilization device in response to received telegraph signals comprising equal length dot and dash marking signal elements in prearranged sequences corresponding to characters expressed in random length code, including a first self-restoring trigger circuit responsive to the start of every marking element, a second self-restoring trigger circuit responsive to the restoration of said first trigger circuit to produce a first electric utilization pulse of time duration determined by the natural period of said second trigger circuit, a third self-restoring trigger circuit coupled to said second trigger circuit and responsive to the restoration of said first trigger circuit to produce a second electric utilization pulse, a charge storing circuit coupled to said first trigger circuit to store an increment of electric energy in response to restoration of said first trigger circuit, a fourth self-restoring trigger circuit coupled to said charge storing circuit, a signal interlock circuit coupled to said first trigger circuit and to said fourth trigger circuit, said interlock circuit being activated in response to the restoration of said fourth trigger circuit to apply a tripping pulse of electric energy to said fourth trigger circuit, said third trigger circuit being activated upon application of said tripping pulse and the charge in said storing circuit attaining a value equal to said predetermined number of restorations of said first trigger circuit to produce a complementary utilization pulse, a fifth self-restoring trigger circuit having an active period longer than that of said third trigger circuit and being coupled to said first and said fourth trigger circuits and arranged to be activated in response to activation of said third trigger circuit to reactivate said third trigger circuit and discharge the charge stored in said charge storing circuit upon restoration of said fifth trigger circuit.

EUGENE RICHARD SHENK.
JAMES CURTIS PHELPS.

No references cited.